June 28, 1949.  J. T. BEECHLYN  2,474,716
SALT WATER BATTERY
Filed Sept. 18, 1944

INVENTOR.
JOHN T. BEECHLYN
BY Ezekiel Wolf
his Attorney

Patented June 28, 1949

2,474,716

UNITED STATES PATENT OFFICE 2,474,716

SALT-WATER BATTERY

John T. Beechlyn, Worcester, Mass., assignor, by mesne assignments, to Submarine Signal Company, Boston, Mass., a corporation of Delaware Application September 18, 1944, Serial No. 554,686

4 Claims. (Cl. 136—103)

The present invention relates to a wet battery of one or more cells which can be used with sea water as the electrolyte.

The art of wet batteries is quite old and many combinations of different metals and electrolytes have been used and devised for providing wet batteries.

In the present invention the applicant has created and constructed a wet battery in which the salt-water medium of the sea or ocean provides the electrolyte and in which such salt water is permitted to circulate through the cells.

With a wet battery of this kind wherein the salt water surrounds the poles and the connecting terminals of the battery, the problem presented is that of making the battery stand up for a reasonable length of time and efficiently provide the energy stored in the battery for use in an external electrical circuit. In the invention as set forth in the present application the battery may be used for a considerable period even for periods of years particularly on low current circuits. The battery according to the present invention may be completely immersed in the salt water as, for instance, on light buoys, and may be left for continuous operation over a long period of time.

Figure 1:
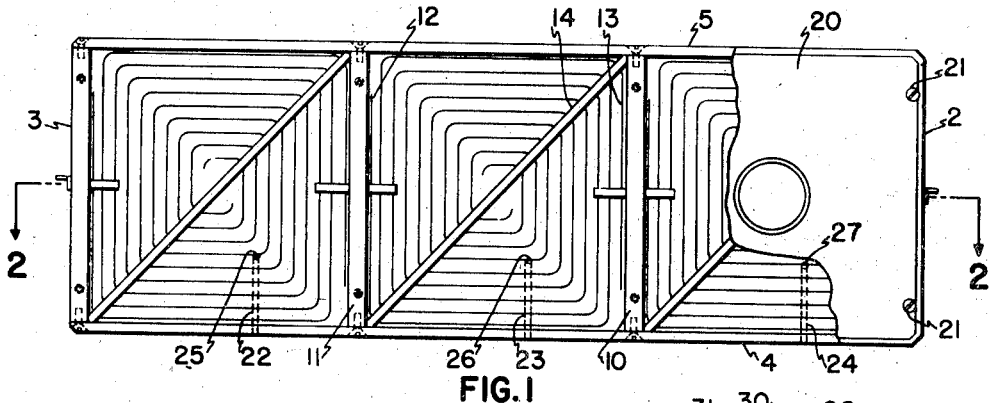
Figure 2:
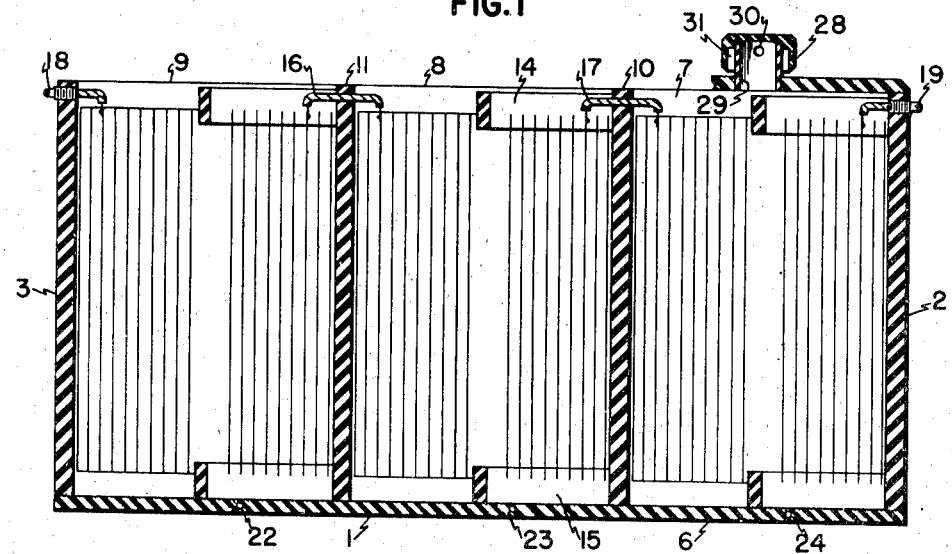
Figures 3, 4:
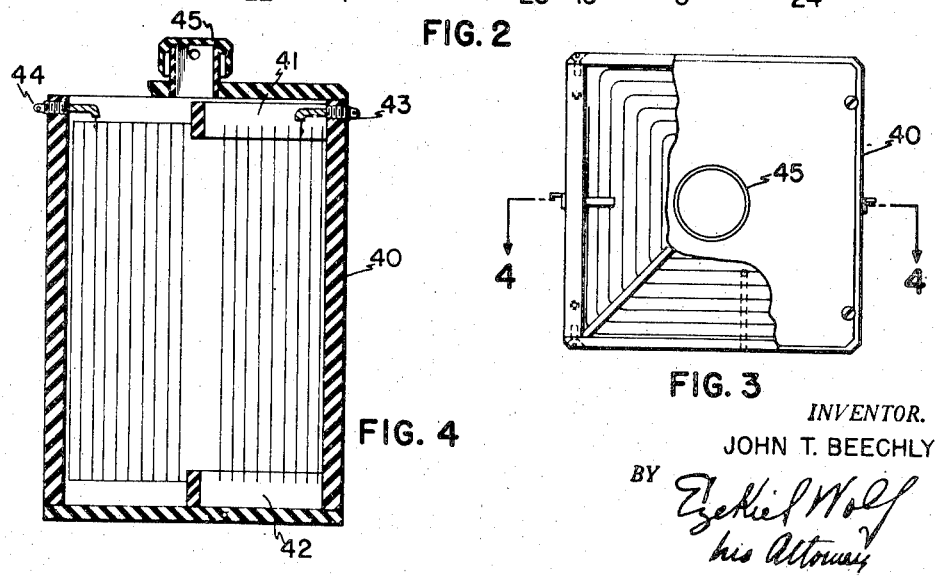

The invention will be described in connection with the embodiment set forth in the specification below and illustrated in the drawings in which Fig. 1 shows a plan view of the battery with the cover partly removed; Fig. 2 shows a section on the line 2—2 of Fig. 1; Fig. 3 shows a modified plan view of the invention with the top partly in section; and Fig. 4 shows a sectional view on the line 4—4 of Fig. 3.

In the arrangement indicated in Figs. 1 and 2 there may be provided an insulating casing 1 with end walls 2 and 3, side walls 4 and 5 and a bottom wall 6. The shape of the battery may be rectangular, square or any other desired or useful shape. The walls may be of insulating material such as hard rubber, some plastic composition, glass or the like. As indicated in Figs. 1 and 2 in which three cells 7, 8 and 9 are shown, insulating partitions 10 and 11 are provided for separating individual cells. As indicated in Fig. 1 the cells so formed are substantially square or rectangular in shape. Within them there are positioned sheets 12 and 13 which form the two poles of the battery. I prefer to use for my electrodes or poles sheets of pure magnesium and pure iron. By using sheets of pure magnesium it is possible to avoid polarization of the battery which occurs through the gathering of hydrogen bubbles on the face of the sheets. As indicated, these sheets which may be of thin material are wound on a frame in a somewhat spiral fashion with the sides, however, maintained parallel with the walls of the cells. The sheets 12 and 13 are formed curves which are substantially parallel to one another and spaced at a uniform distance apart from one another for their whole length. This so-called square spiral arrangement is supported in position by means of two diagonal bars 14 and 15 which have their ends cut to fit into the corners of the cell and which are also supplied with uniform slots in which the end edges of the sheets rest. No connection is made between the sheets and sides of the box so that but for electrical terminal connections any plate assembly with its two poles could be removed.

In the arrangement indicated in Figs. 1 and 2 the batteries are connected together by means of terminal connections 16 and 17 which preferably pass through the top portions of the partitions 10 and 11 in the casing. The terminal connections to the battery as a whole are made through the end terminals 18 and 19. The top of the battery is covered with a cover 20 which may be held to the walls of the cover by means of the screws 21, 21, spaced uniformly around the top cover.

In regard to the circulation of the salt water within the battery, a long liquid highly resistant path of flow is provided for the water entering or leaving the cell. This is accomplished for each cell by means of the small passages 22, 23, 24 made in the bottom wall 6 and extending from the outside deep into the plate forming the bottom. The passage to the interior of the cell is completed through the openings 25, 26 and 27 which connect to the passages 22, 23, and 24 respectively. These long narrow passages are so proportioned with respect to the cells themselves that the electrical resistance along each passage is many times as great as the internal resistance of the associated cell. In the cover 20 of the battery there are provided gas vents 28. A short neck passage formed by the collar 29 extends up through the cover 20 and is provided near its top with a hole or holes 30 through the wall of the neck. This neck 29 is capped by means of the cap 28 which rests tightly on the end of the neck 29 but does not entirely cover the hole 30. The cap 28 is recessed around its inner wall below the place where it fits over the neck 29 providing an inverted chamber 31 through which the gas is forced out. Consideration of this arrangement will show that the gas emitted by the battery, which may be hydrogen, settles in the upper part of the neck 29, displacing the water therein. The pressure from the outside may force the liquid up under the cap 28 but there would be a region at the top of the cap in which the gas bubble will be compressed and from which the gas will be released as sufficient gas is generated. The cover 20 is firmly placed upon the battery box but it does not need to be absolutely watertight since a small leakage providing a high resistance path will do no harm if this resistance path is less than that of the communicating passage through which the salt water flows into the battery cells. A high resistance path is also provided in the cap arrangement so that the only ground between cells is that provided by the filling passages mentioned above.

In the arrangement indicated in Figs. 3 and 4 a one-cell battery 40 is shown which is similar in construction to a single cell of the battery shown in Figs. 1 and 2. This may be provided with internal supporting bars 41 and 42 upon which the poles of the battery are mounted and also may be provided with external terminals 43 and 44 through which connections to the battery are made. Similarly a cap 45 providing a vent through which the gas may escape may also be used. Batteries of the type herein described may produce a small current for a considerable period of time at a voltage which is equal to that of the cell voltage times the number of cells. It is possible to obtain from a three-cell battery a voltage approximately equal to four or five volts and sufficient current to provide illumination of a buoy, for instance, over a considerable period of time, perhaps even as long as two years.

The invention will, of course, find other uses. It may be used in connection with any electrical apparatus which may be exposed to a salt-water medium.

Having now described my invention, I claim:

1. A salt water battery comprising a casing of insulating material substantially enclosed from the water medium, said casing being divided into a plurality of individual cells, each cell having a water flow passage of high electrical resistance compared to the electrical resistance of the cell; each said cell being provided with electrodes formed of opposed sheets of different metals and means supporting said sheets in a supporting frame within the cell, said cells being provided with a cover member, means contained in said cover member providing an escape for generated gases including a gas trap adapted to trap a volume of gas in said cover between the escape to the outside and the inside of said casing and form an insulation between the liquid within the medium and the external liquid.

2. A salt water battery adapted for total immergence in ocean water comprising a plurality of individual cells incased in insulating materials, each of said cells having positive and negative electrodes formed of different sheet metals positioned so that the positive sheet electrode is opposed to the negative sheet electrode, terminal members connecting said cells together, said members being insulated from salt water outside said cells, means of ingress for salt water in each cell having an electrical resistance which is many times the internal resistance of the battery and means of egress for electrolyzed gas consisting of a gas trap at the top of each cell, communicating with the outer ocean water.

3. A salt water battery adapted for total immergence in ocean water comprising a plurality of individual cells incased in insulating materials, each of said cells having interleaved positive and negative electrodes of different sheet metals formed as square spirals, two braces running diagonally across the spiral slotted to receive the ends of the electrode sheets so that the electrode sheets are fixed substantially equidistant from each other, terminal members connecting said cells together, said members being insulated from salt water outside said cells, means of egress for salt water in each cell having an electrical resistance which is many times the internal resistance of the battery and means of egress for electrolyzed gas consisting of a gas trap at the top of each cell, communicating with the outer ocean water.

4. In a wet battery having cells adapted for total immergence in a fluid medium, means of covering each of said cells including an upwardly extending sleeve with a hole through the side thereof adjacent the top thereof and a cap positioned on the top of said sleeve extending downward lower than the said hole and providing an annular space between the downwardly extending portion of the cap and said sleeve with which said hole communicates forming a gas trap thereby permitting the escape of electrolyzed gas while retaining a separation of the external fluid medium from the cell liquor.

JOHN T. BEECHLYN.

REFERENCES CITED

The following references are of record in the file of this patent:

UNITED STATES PATENTS

| Number | Name | Date |
| --- | --- | --- |
| 944,079 | Decker | Dec. 21, 1909 |
| 1,116,893 | Hutchison | Nov. 10, 1914 |
| 1,331,089 | Berry | Feb. 17, 1920 |
| 1,522,121 | Harrison | Jan. 6, 1925 |
| 1,560,798 | Harris | Nov. 10, 1925 |
| 1,807,595 | Kershaw | June 2, 1931 |
| 1,851,481 | Baba | Mar. 29, 1932 |
| 2,115,744 | Orland | May 3, 1938 |
| 2,177,235 | Winckler | Oct. 24, 1939 |

FOREIGN PATENTS

| Number | Country | Date |
| --- | --- | --- |
| 34,913 | Germany | Apr. 1, 1886 |
| 392,208 | Great Britain | May 15, 1933 |

Certificate of Correction

Patent No. 2,474,716. June 28, 1949.

JOHN T. BEECHLYN

It is hereby certified that error appears in the printed specification of the above numbered patent requiring correction as follows:

Column 4, line 21, claim 3, for the words "egress for" read *ingress for*;

and that the said Letters Patent should be read with this correction therein that the same may conform to the record of the case in the Patent Office.

Signed and sealed this 22nd day of November, A. D. 1949.

[SEAL]

THOMAS F. MURPHY,
*Assistant Commissioner of Patents.*